United States Patent
Silken

(12) 
(10) Patent No.: US 6,257,809 B1
(45) Date of Patent: Jul. 10, 2001

(54) TAPPING APPARATUS AND METHOD

(76) Inventor: Howard Silken, 5600 Forest Oaks Ter., Delray Beach, FL (US) 33484

( * ) Notice: Subject to any disclaimer, the term of this patent is extended or adjusted under 35 U.S.C. 154(b) by 0 days.

(21) Appl. No.: 09/587,605

(22) Filed: Jun. 5, 2000

Related U.S. Application Data

(60) Provisional application No. 60/146,770, filed on Jul. 31, 1999.

(51) Int. Cl.⁷ .............................. B23G 1/18; B23G 5/06
(52) U.S. Cl. .......................... 408/129; 408/222; 470/96; 470/101; 470/198
(58) Field of Search ............................. 408/97, 112, 129, 408/137, 138, 222, 101; 470/96, 101, 102, 198

(56) References Cited

U.S. PATENT DOCUMENTS

| | | | |
|---|---|---|---|
| 899,916 | * | 9/1908 | Smith .................................. 470/198 |
| 1,111,413 | * | 9/1914 | Smith .................................. 470/198 |
| 3,945,069 | | 3/1976 | Cecil . |
| 5,529,442 | | 6/1996 | Jorgensen . |
| 5,797,710 | | 8/1998 | Sawabe . |
| 5,876,158 | | 3/1999 | Beiter . |
| 6,012,878 | | 1/2000 | Hicks . |

OTHER PUBLICATIONS

MSC Industrial Supply Co Catalog Melville, NY 11747 page Describing Nut Tap HSH3 Part No. 0468023 2 pages total.

* cited by examiner

*Primary Examiner*—Steven C. Bishop
(74) *Attorney, Agent, or Firm*—Alvin S. Blum

(57) ABSTRACT

Apparatus for tapping or threading holes in material reduces stresses and the danger of breakage of the tap by rotatably driving the tap at locations on the tap that change as the tap enters the workpiece. The driving element engages the tap at a point close to the surface of the workpiece. As the tap advances into the workpiece, the driving element remains close to the workpiece surface, engaging the tap at sites progressively advancing toward the end of the tap. Special taps are provided, one of which is double ended. This may be turned end for end to double the useful cutting life. This embodiment is driven by its flutes. Another tap is driven by a non-circular shaft extending from the threaded portion of the tap. The taps may be removed from the workpiece by passing through the threaded hole, thereby eliminating the need to unscrew the tap through the already tapped hole.

18 Claims, 2 Drawing Sheets

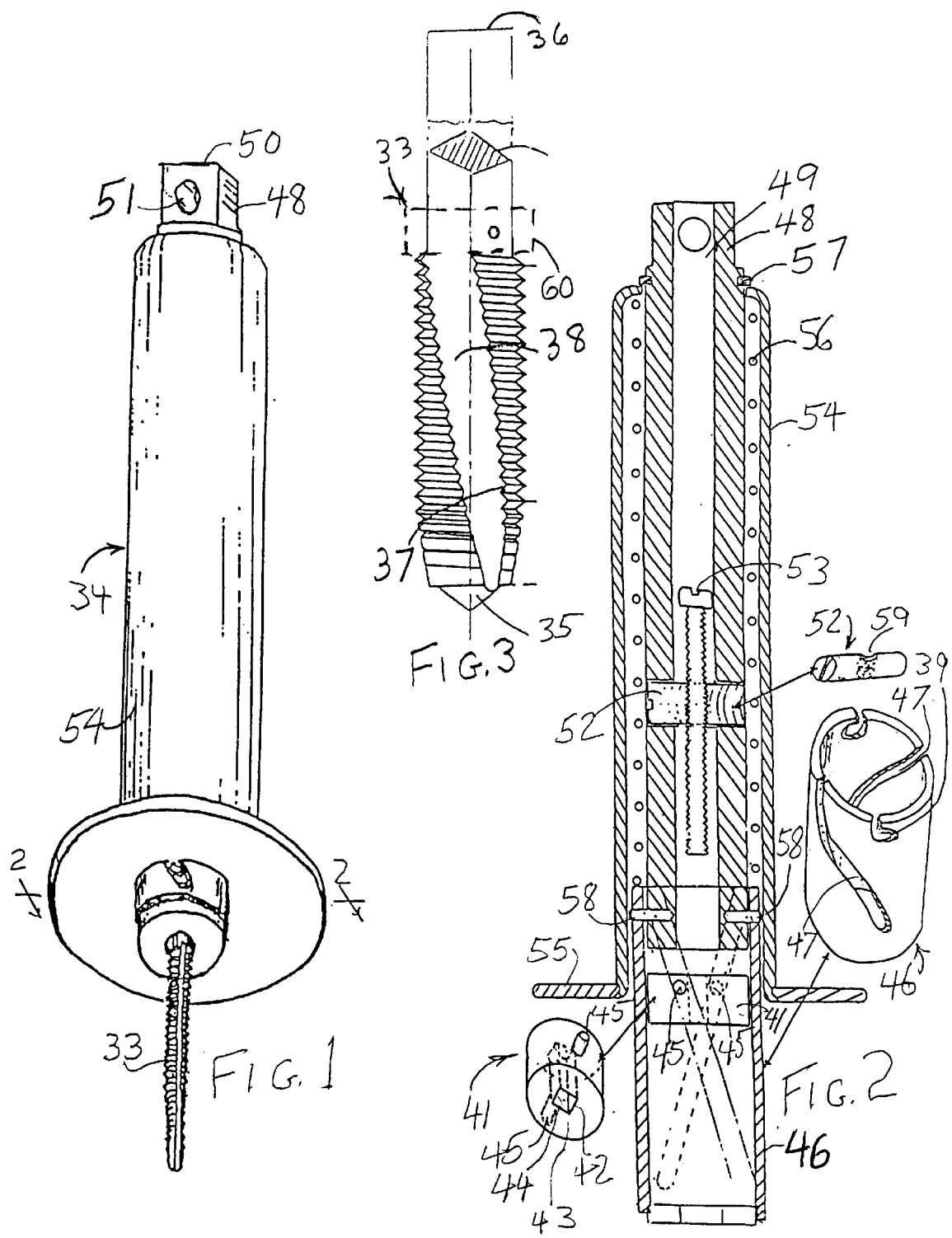

TAPPING APPARATUS AND METHOD

This invention is based upon Provisional Patent Application Serial No. 60/146,770, filed Jul. 31, 1999 incorporated herein by reference.

BACKGROUND OF THE INVENTION

This invention relates to an improved apparatus and method for threading holes in material.

DESCRIPTION OF THE PRIOR ART

Current methods of tapping, or forming threads in a hole, generally use a hard steel tap with a tapered threaded first end that cuts the threads as it is rotated at a second end. Longitudinal grooves, or flutes, which may be straight or helical, interrupt the threads to generate cutting elements, and to carry the chips generated by the cutting elements. They reduce, but not entirely eliminate, the binding effect that the chips have on the revolving tap. Binding of the tap requires increasing torque at the driving end to advance it. The increased twisting of the tap may break it, often leaving the broken end stuck in the hole. This not only results in loss of the tap, but also often means scrapping the part due to the cost of removal of the broken tap. Taps bind at the cutting end, and are driven at the opposite end. The torque of the driven end twists the tap, and this twisting is what causes the tap to break. The longer the tap, or the distance between the driven end and the cutting end, the greater the twisting action and the threat of breakage. If this distance could be shortened, it would reduce tap breakage. After a hole is tapped, the tap is removed by reverse rotation. This is time consuming, and may damage the already formed threads by going over them a second time with other cutting edges. An exception is the nut tap that puts short threads in nuts. These are made with a long cylindrical shaft between the thread cutting portion and the squared driver end. As each nut is threaded, it advances onto the cylindrical shaft, pushed there by the next nut. After many nuts are threaded and collected on the shaft, the driver end is disconnected and the accumulated nuts removed. It would be useful in many operations to be able to remove a tap from the hole after the thread is cut without reverse rotation of the tap, or disconnection of the driver end. When a tap has been driven part way through the hole, resistance to rotation builds up. Because of the danger of tap breakage, it is common practice to periodically reverse rotation at these times to break off the chips. This increases tapping time and effort. It may also increase tap breakage, because starting friction is greater than sliding friction. It would be desirable to have a tapping system with reduced threat of breakage, because the hole may then be threaded with one continuous rotation.

SUMMARY OF THE INVENTION

It is accordingly an object of the invention to provide apparatus that will reduce the distance between the cutting elements of the tap and the rotational driving force. The apparatus and method of the invention comprises means for rotationally driving the tap at a driving location intermediate its two ends, and for automatically adjusting the driving location to maintain a minimum distance between the driving location and the actively cutting portions of the tap as the tap progresses through the hole. Since this reduces tap breakage, it makes it possible, in many situations, to continuously rotate the tap without periodic reversals. When there is no stopping of the rotation, there is no starting friction as it is started up again. This further reduces tap breakage. It is another object to provide a tapping system that will enable the tap to pass through the threaded hole and be removed from the other side of the workpiece, either automatically or manually, so as to avoid having to unscrew the tap to remove it. It is yet another object to provide a tapping system that maintains a correct position of the tap orthogonal to the workpiece surface for enhanced quality of operation and reduced tap breakage. These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a perspective view of the apparatus of the invention in which the tap is rotated by engagement of a non-circular tap shaft.

FIG. 2 is a sectional view taken on line 2—2 of FIG. 1.

FIG. 3 is a front elevation view, partially broken away, of the tap used in FIG. 1.

DETAILED DESCRIPTION OF PREFERRED EMBODIMENTS

Figure 5:
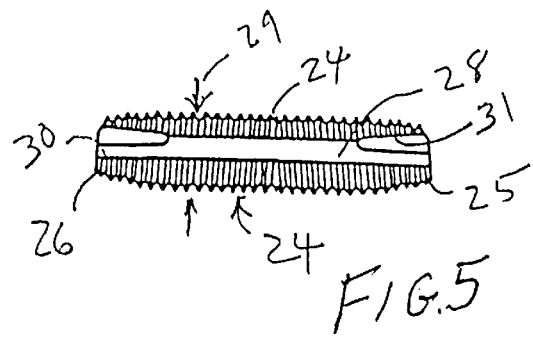
FIG. 5 is a front elevation view of a tap used in the apparatus of FIG. 4.

Referring now to the drawing FIGS. 1–3, apparatus 34 for tapping a thread in a hole in a workpiece has a tap tool 33 with a first end 35 and a second end 36. Thread forming cutting elements 37 about the circumference are interrupted by flutes 38 that may be straight or helical, as is well known in the art. A square shaft 40 extends from the threaded portion of the tool to the end 36. Its dimensions are small enough that it will permit the tool to pass through the hole after it is threaded. This eliminates the need to unscrew the tap. A driving member 41 has a square internal passage 42 constructed to encircle the shaft 40 and permit axial motion of the tap therethrough, while having engaging elements 43 on the inner aspect of the passage that will cause the tap to rotate in concert with the driving member. In this case the shaft has a square cross section and the passage is correspondingly square. Shown in phantom on FIG. 3 is an optional threaded collar 60 with set screw for depth limiting. Alternatively, the shaft may have other non-circular cross sections with corresponding engaging elements on the inner aspect of the passage (not shown). A spring finger retainer 44 may be provided to releasably engage the shaft just enough to prevent the tap from dropping out when held vertically. Radial projections 45 outwardly extending from the driving member 41 engage helical slots 47 in a cylindrical sleeve 46. Slots 39 in sleeve 46 receive pins 58 in rotary driving means 48 for a bayonet type releasable attachment so that different sleeves 46 with different size driving members 41 may be easily substituted for changing tap size. The rotary driving means 48 has a square end 50 to fit a socket on a power tool 9 (not shown), and a hollow shaft 49. A transverse hole 51 in end 50 enables the device to be rotated manually by insertion of a screwdriver therein. A rod 52 is mounted in the shaft 49 with a threaded through hole 59 to receive adjusting screw 53. This may be adjusted to engage the end 36 of the tap to cause the tap to extend out of the apparatus as much as is required. When the driving means 48 is rotated, pins 45 in sleeve 46 riding in slots 47, and the driving member 41, and the tap are forced toward the workpiece. As the tap begins to cut, the tap is pulled down into the hole, and the portion of the tap shaft 40 that is engaged by the rotating driving member moves toward the end 36. This ensures that the minimum distance between the rotational force on the tap and the cutting elements is maintained to reduce tap breakage. An outer cylinder 54 with flange 55 extending orthogonally at one end is held captive about the rotary driving means 48 by retaining ring 57. Extension spring 56 holds the flange clear of the workpiece. When the tap is inserted into the hole, the flange 55 is pressed against the workpiece before starting rotation. This ensures that the tap will be held orthogonal to the surface of the workpiece.

Figure 4:
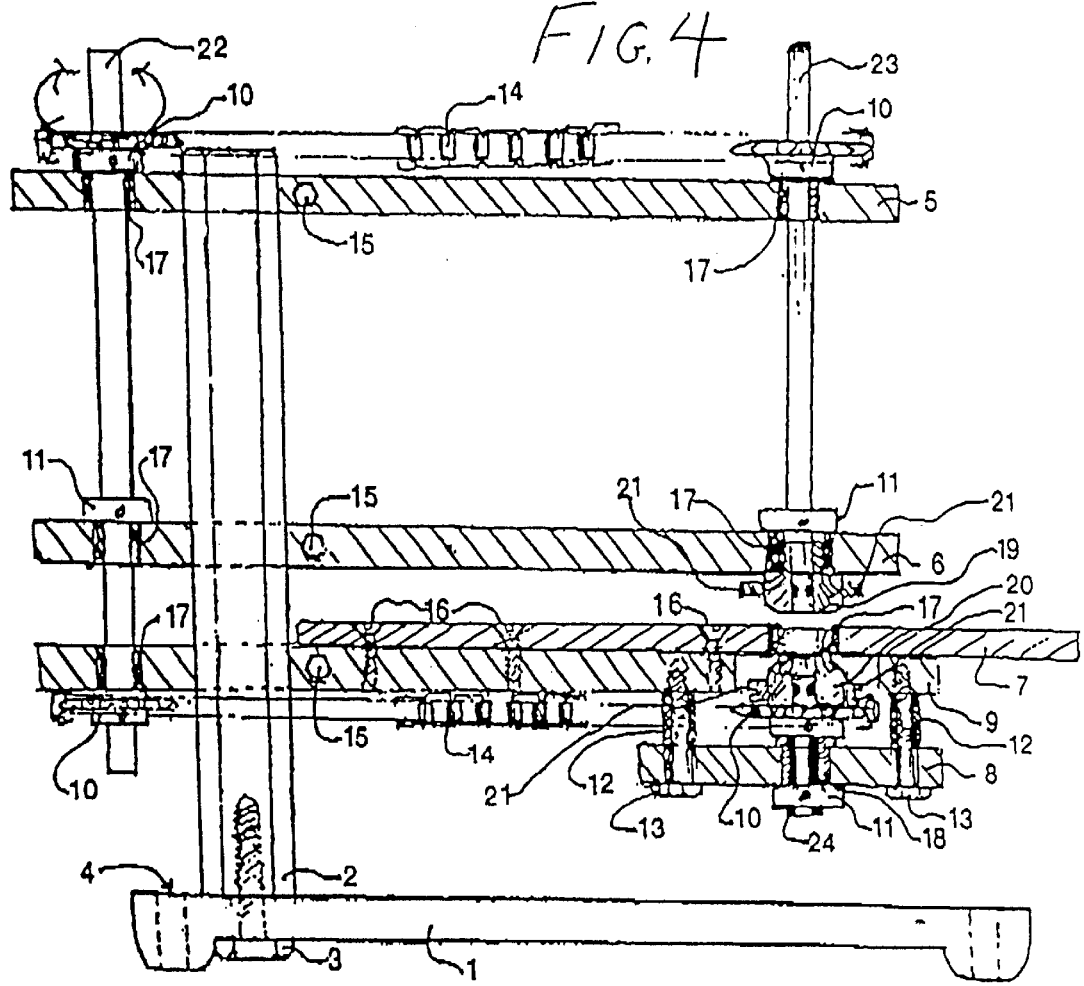
FIG. 4 is a sectional view of another embodiment of the invention in which the tap is rotated by engagement of the tap flutes.

Referring now to the embodiments of the invention shown in FIGS. 4 and 5, the tap 24 is driven by its flutes 28. The tap has a threaded circumference 27, with the circumference reducing toward the first thread cutting end 25 and the identical second cutting end 26. The threads are interrupted by a plurality of flutes 28, generating a first set of cutting elements 30 operative when the tap is rotated in a first direction, and a second set of cutting elements 31 operative when the tap is turned end for end to rotate in the opposite direction. This doubles the useful life of the tap. The tap has no shaft for driving it. The tap is held and driven by assembly 29. The tap is dropped down into hollow shaft 23. Upper drive member 19 is affixed to shaft 23 to rotate with it. An inner passage through drive member 19 has flute-engaging pins 21 extending inward from its inner aspect. These pins cause the tap to rotate but do not inhibit axial motion of the tap as it enters the hole. When all of the threads have been cut, the tap will continue to advance, with little resistance because its circumference in contact with the hole is diminishing. The tap will then drop out below the workpiece. Optionally, a second drive member, as shown, may be mounted below the work table 7. Both drive members are driven synchronously by sprocket gears 10 and roller chain 14. As the tap emerges below the work table, it is engaged by the lower drive member, reducing the torque stresses by driving the tap above and below the workpiece. This may be especially helpful in tapping thick material. When the tapping is completed, the tap drops out of the lower drive member. It may be caught and loaded back into the shaft 23 manually or by automatic means well known in the art.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. An apparatus for tapping a thread in a hole in a workpiece, comprising:
   a) an elongate tap tool having a first end and a second end, the tool having thread forming cutting elements at positions around its circumference, the cutting elements interrupted by longitudinal flutes, the circumference of the cutting elements being gradually reduced toward the first end;
   b) a driving member that encircles the tap tool having an internal passage with sufficient clearance to enable the tool to move in an axial direction in the driving member while tapping a hole;
   c) at least one engaging element on the inner aspect of the passage constructed for engaging non-circular portions of the tool sufficiently to cause the tool to rotate with the driving element, while allowing axial motion of the tool relative to the driving member;
   d) rotary driving means connected to the driving member for rotating the driving member and the tool; and
   e) wherein rotating the driving member and the tool by the rotary driving means, when the tool is in a hole, will cause the tap tool to cut threads in the hole, and as the tool advances in the hole the driving member will be automatically moved axially toward the second end.

2. The apparatus according to claim 1, in which the driving member is provided with outwardly extending radial projections, and the rotary driving means includes a cylindrical sleeve with helical slots that receive the projections.

3. The apparatus according to claim 2, in which the at least one engaging element fits into at least one of the flutes, and the tool is constructed to pass through the threaded hole.

4. The apparatus according to claim 1, in which the at least one engaging element fits into at least one of the flutes, and the tool is constructed to pass through the threaded hole.

5. The apparatus according to claim 1, in which the tap tool is provided with a shaft having a non-circular cross section extending from the cutting elements to the second end and the at least one engaging element is shaped to engage the shaft.

6. The apparatus according to claim 2, in which the tap tool is provided with a shaft having a non-circular cross section extending from the cutting elements to the second end and the at least one engaging element is shaped to engage the shaft.

7. An apparatus for tapping a thread in a hole in a workpiece, comprising:
   a) an elongate tap tool having a first end and a second end, the tool having thread forming cutting elements at positions around its circumference, the cutting elements interrupted by longitudinal flutes, the circumference of the cutting elements being gradually reduced toward the first end, and a shaft having a non-circular cross section extending from the cutting elements to the second end;
   b) a driving member that encircles the tap tool having an internal passage with sufficient clearance to enable the tool to move in an axial direction in the driving member while tapping a hole;
   c) at least one engaging element on the inner aspect of the passage constructed for engaging non-circular portions of the shaft sufficiently to cause the tool to rotate with the driving element, while allowing axial motion of the tool relative to the driving member;
   d) rotary driving means connected to the driving member for rotating the driving member and the tool; and
   e) wherein rotating the driving member and the tool by the rotary driving means, when the tool is in a hole, will cause the tap tool to cut threads in the hole, and as the tool advances in the hole the driving member will be automatically moved axially toward the second end.

8. The apparatus according to claim 7, in which the driving member is provided with outwardly extending, radial projections, and the rotary driving means includes a cylindrical sleeve with helical slots that receive the projections.

9. The apparatus according to claim 8, in which the shaft has a rectangular cross section.

10. The apparatus according to claim 7, in which the shaft has a rectangular cross section.

11. An apparatus for tapping a thread in a hole in a workpiece, comprising:
   a) an elongate tap tool having a first end and a second end, the tool having thread forming cutting elements at positions around its circumference, the cutting elements interrupted by longitudinal flutes, the circumference of the cutting elements being gradually reduced toward the first end, and the maximum circumference of the tool beyond the cutting elements being less than the inside diameter of the hole so that the tool may pass through the threaded hole;
   b) a driving member that encircles the tap tool having an internal passage with sufficient clearance to enable the tool to move in an axial direction in the driving member while tapping a hole;
   c) engaging elements on the inner aspect of the passage constructed for engaging the flutes sufficiently to cause the tool to rotate with the driving element, while allowing axial motion of the tool relative to the driving member;
   d) rotary driving means connected to the driving member for rotating the driving member and the tool; and
   e) wherein rotating the driving member and the tool by the rotary driving means, when the tool is in a hole, will cause the tap tool to cut threads in the hole, and as the tool advances in the hole the driving member will be automatically moved axially toward the second end.

12. The apparatus according to claim 11, in which the driving member is provided with outwardly extending radial projections, and the rotary driving means includes a cylindrical sleeve with helical slots that receive the projections.

13. In an apparatus for tapping a thread in a hole in a workpiece that has an elongate tap tool having a first end and a second end, a driving member that encircles the tap tool having an internal passage with sufficient clearance to enable the tool to move freely in an axial direction in the driving member while tapping a hole, at least one engaging element on the inner aspect of the passage constructed for engaging non-circular portions of the tool sufficiently to cause the tool to rotate with the driving element, while allowing axial motion of the tool relative to the driving member, rotary driving means connected to the driving member for rotating the driving member and the tool, the improvement comprising:
   a tap tool having a first end and a second end, the tool having thread forming cutting elements at positions around its circumference, the cutting elements interrupted by axially extending flutes, the maximum diameter of the cutting elements being progressively reduced toward the first end; an elongate shaft extending from the cutting elements to the second end, the shaft having a non-circular cross section for cooperation with the at least one engaging element of the driving member to cause the tool to rotate with the driving member when the driving member is rotated by the rotary driving means, while allowing axial motion of the tool relative to the driving member; and wherein rotating the driving member and the tool by the rotary driving means, when the tool is in a hole, will cause the tap tool to cut threads in the hole, and as the tool advances in the hole the driving member will be automatically moved axially toward the second end.

14. The apparatus according to claim 13, in which the shaft is rectangular in cross section.

15. In an apparatus for tapping a thread in a hole in a workpiece that has an elongate tap tool having a first end, a second end, and flutes along a threaded portion; a driving member that encircles the tap tool having an internal passage with sufficient clearance to enable the tool to move in an axial direction in the driving member while tapping a hole, a plurality of engaging elements on the inner aspect of the passage constructed for engaging the flutes sufficiently to cause the tool to rotate with the driving element, while allowing axial motion of the tool relative to the driving member, rotary driving means connected to the driving member for rotating the driving member and the tool, the improvement comprising:
   a tap tool having a first end and a second end, the tool having a threaded portion with thread forming cutting elements at positions around its circumference, the threaded portion interrupted by axially extending flutes, the maximum diameter of the cutting elements being progressively reduced toward the first end; a shaft extending from the threaded portion to the second end, the shaft having flutes continuous with the flutes portion for cooperation with the engaging elements of the driving member to cause the tool to rotate with the driving member when the driving member is rotated by the rotary driving means, while allowing axial motion of the tool relative to the driving member such that the engaging elements will first engage the flutes of the threaded portion of the tool to rotate the tool during thread forming and then drive the tool by the flutes in the shaft after the threaded portion has passed into the workpiece; the maximum diameter of the tool beyond the cutting elements being less than the inside diameter of the threaded hole, and wherein rotating the driving member and the tool by the rotary driving means, when the tool is in a hole, will cause the tap tool to cut threads in the hole, and as the tool advances in the hole the driving member will be automatically moved axially toward the second end, continuing to rotate the tool until the tap tool drops from the workpiece.

16. The apparatus according to claim 11, further comprising:
   a second driving member positioned beneath the workpiece with engaging elements for engaging the flutes of the tap tool when the tool emerges beneath the workpiece; and a rotary driving means connected to the second driving member for rotating the second driving member in synchrony with the first driving member.

17. In an apparatus for tapping a thread in a hole in a workpiece that has an elongate tap tool having a first end, a second end, and flutes along a threaded portion; a driving member that encircles the tap tool having an internal passage with sufficient clearance to enable the tool to move in an axial direction in the driving member while tapping a hole, a plurality of engaging elements on the inner aspect of the passage constructed for engaging the flutes sufficiently to cause the tool to rotate with the driving element, while allowing axial motion of the tool relative to the driving member, rotary driving means connected to the driving member for rotating the driving member and the tool, the improvement comprising:
   a tap tool with double the cutting elements of conventional tap tools having a first end and a second end, the tool having a threaded circumference with thread forming cutting elements at positions around its circumference, interrupted by axially extending flutes, the maximum diameter of the cutting elements being progressively reduced toward the first and the second ends, the flutes constructed for receiving the engaging elements of the driving member to cause the tool to rotate with the driving member when the driving member is rotated by the rotary driving means, while allowing axial motion of the tool relative to the driving member such that the thread cutting elements will cut a thread in the workpiece as progressively larger diameter cutting elements advance into the workpiece, and then, when the thread cutting is completed, the engaging elements will continue to rotate the tool as the progressively smaller diameter cutting elements advance into the workpiece, until the tap drops out beneath the workpiece, wherein the tap tool can be turned end for end to enable a second set of cutting elements to be operative.

18. The apparatus according to claim 2, further comprising a spring biased cylinder with a long axis, and having a flange at a first end disposed orthogonal to the axis, the cylinder held captive around the cylindrical sleeve with the flange end toward the tap tool end and biased away from the tap tool end of the cylindrical sleeve to provide a means to ensure that the tap is presented orthogonal to the workpiece surface.

* * * * *